(12) United States Patent
Pizot et al.

(10) Patent No.: US 12,445,306 B2
(45) Date of Patent: Oct. 14, 2025

(54) HASH CHAIN OF BLOCKS OF PUBLIC KEYS FOR MESSAGES

(71) Applicant: Hewlett-Packard Development Company, L.P., Spring, TX (US)

(72) Inventors: Laurent Pizot, Vancouver, WA (US); Stephen D. Panshin, Corvallis, OR (US); Thalia May Laing, Bristol (GB)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 105 days.

(21) Appl. No.: 18/585,350

(22) Filed: Feb. 23, 2024

(65) Prior Publication Data

US 2025/0274290 A1    Aug. 28, 2025

(51) Int. Cl.
| | | |
|---|---|---|
| *H04L 29/06* | (2006.01) | |
| *H04L 9/00* | (2022.01) | |
| *H04L 9/08* | (2006.01) | |
| *H04L 9/32* | (2006.01) | |

(52) U.S. Cl.
CPC .......... *H04L 9/3247* (2013.01); *H04L 9/0825* (2013.01); *H04L 9/3236* (2013.01); *H04L 9/50* (2022.05)

(58) Field of Classification Search
CPC ... H04L 9/3247; H04L 9/0825; H04L 9/3236; H04L 9/50
See application file for complete search history.

(56) References Cited

U.S. PATENT DOCUMENTS

| | | | |
|---|---|---|---|
| 11,184,157 B1 | 11/2021 | Gueron et al. | |
| 12,231,580 B1 | 2/2025 | McMahon et al. | |
| 12,321,580 B2 | 6/2025 | Wang | |
| 2016/0218879 A1* | 7/2016 | Ferrin | G09C 1/00 |
| 2018/0337772 A1* | 11/2018 | Acar | H04L 9/083 |
| 2020/0387639 A1* | 12/2020 | Hummel | H04L 9/3297 |
| 2021/0176072 A1 | 6/2021 | Chalkias | |
| 2022/0086009 A1 | 3/2022 | Vacek et al. | |
| 2022/0224548 A1* | 7/2022 | Mondello | H04L 9/0861 |
| 2025/0132936 A1* | 4/2025 | Kanovitz | H04L 9/50 |

* cited by examiner

*Primary Examiner* — Mahfuzur Rahman
(74) *Attorney, Agent, or Firm* — Michael Dryja (57) ABSTRACT

A block to be added to a hash chain is generated. The block is for a message to be sent and includes a link hash of a prior block previously added to the hash chain. The prior block includes a public key corresponding to a private key to be used to digitally sign the block. The block includes a payload hash of a payload of the message, and a next public key corresponding to a next private key to be used to digitally sign a next block to be added to the hash chain after the block. The next block is for a next message to be sent after the message. The block is digitally signed with the private key and added to the hash chain. The link hash links the block to the prior block in the hash chain. The message is sent.

20 Claims, 8 Drawing Sheets

HASH CHAIN OF BLOCKS OF PUBLIC KEYS FOR MESSAGES

BACKGROUND

Computing and other types of electronic devices are often communicatively connected to networks so that they can send messages to each other. Asymmetric cryptography can be used for message authentication. Specifically, a sending device has a cryptographic key pair made up of a private key and a corresponding public key. The sending device digitally signs a message with the private key before sending it to a receiving device. The receiving device uses the corresponding public key to authenticate that the message was signed by the private key and, assuming that the receiving device trusts that the public key is associated with the sending device, thus that the message was sent by the sending device.

DETAILED DESCRIPTION OF THE DRAWINGS

As noted in the background, asymmetric cryptography can be used for message authentication. Upon receiving a message from a sending device that has been digitally signed with a private key, a receiving device can use the corresponding public key to authenticate that the message was sent by the sending device if the receiving device trusts that the public key is associated with the sending device. Traditionally a sending device has used the same private key to digitally sign multiple messages sent to the same or different receiving devices, with the receiving devices then using the same corresponding public key to authenticate the messages. This means that each receiving device may have to receive the public key just once, and moreover may have to authenticate the public key just once in order to trust that the public key is associated with the sending device.

However, with the advent of quantum computing, existing asymmetric cryptography is susceptible to compromise. The usage of quantum computing can permit a nefarious party to determine the private key that a sending device uses to digitally sign messages, and therefore to subsequently masquerade as the sending device. Quantum computing attack-resistant asymmetric cryptography schemes have been developed. For instance, hash-based signature schemes, such as the Leighton-Micali one-time signature (LM-OTS), the Winternitz one-time signature (WOTS), and the WOTS+ schemes are resistant to quantum computing attacks and can be used for digital signature and authentication purposes.

A hallmark of such hash-based quantum computing attack-resistant cryptography schemes is the usage of OTSs. In such schemes, the private key of a given cryptographic key pair can be used just once, to digitally sign a single message. Therefore, the corresponding public key of the key pair is also used just once, to authenticate a single digitally signed message. So long as the private key is not used to digitally sign more than one message, quantum computing may not be able to be used to determine the private key. The private key is thus an OTS private key—and its corresponding public key is likewise an OTS public key—in order to maintain resistance to computing attacks, including quantum computing attacks.

A difficulty with using OTS public keys to authenticate messages is that the receiving device has to trust each public key is associated with the sending device in order to authenticate that the corresponding message was indeed sent by the sending device. It is impracticable for the receiving device to individually authenticate each public key, however. The Leighton-Micali signature (LMS) scheme, which uses LM-OTSs, and the extended Merkle signature scheme (XMSS), which uses WOTS+, provide ways to avoid a receiving device having to individually authenticate each OTS public key in order to trust that the public key is associated with a sending device.

For instance, $2^h$ OTS private keys may be generated using a seed value and a state, such as a counter that is incremented from 0 to $2^h-1$. Corresponding OTS public keys are generated, and combined in a binary tree known as a Merkle tree, which has height h. The OTS public keys correspond to the leaf nodes of the tree, and a root public key corresponds to the root node.

To authenticate that a message has been sent by the sending device, the receiving device does not have to receive the corresponding OTS public key, and thus does not have to authenticate that the OTS public key is itself associated with the sending device. Rather, the receiving device just has to authenticate that the root public key is associated with the sending device.

Specifically, the receiving device authenticates the message using the root public key, the digital signature of the message, and the authentication path from the leaf node corresponding to the OTS public key to the root node in the Merkle tree (where the receiving device has already authenticated the root public key as being associated with the sending device). The authentication path can be included in the message itself.

That is, the receiving device itself calculates a candidate OTS public key from the message and the digital signature of the message, the latter which the sending device generated when digitally signing the message with the OTS private key. The receiving device then verifies that the candidate OTS public key it calculated is part of the binary tree including the root public key, using the authentication path.

Such approaches permit authentication of up to $2^h$ messages using the same trusted root public key. The value for $2^h$ has to be decided before the root public key is generated, however, and cannot be subsequently changed. If the selected value for $2^h$ is too small, a sending device may run out of OTS private keys. The OTS private keys and their corresponding OTS public keys have to be generated before the root public key can be generated, and thus before the first message is sent. Generation of the Merkle tree is therefore computationally expensive, and can be computationally prohibitive for lightweight devices such as Internet of Things (IoT) devices.

Selecting a large value for $2^h$ to ensure that a sending device does not run out of OTS private keys is not a panacea, however. Merkle trees for large values of $2^h$ can require a large amount of storage space, which lightweight devices in particular may not have. For example, schemes such as the LMS-hierarchical signature system (HSS) scheme and the multi-tree XMSS (XMSS^MT) scheme, among others, permit the OTS public keys to not have to be stored after generation, but at the cost of requiring more computation later. Ultimately, quantum computing attack-resistant authentication has proven to either be computationally expensive and thus slow, require a relatively large amount of storage space such as volatile as well as non-volatile memory, or both.

Techniques described herein ameliorate these issues. The techniques employ a hash chain of blocks of OTS public keys. The origin, or root, block of the hash chain includes the OTS public key for the first message that will be sent by a sending device, even before the first message has been generated. After generating the first message but before sending it, the sending device adds a block to the hash chain for the message which links to the origin block. The block includes a payload hash of the message's payload, and is digitally signed with the OTS private key corresponding to the OTS public key included in the origin block. The block also includes the OTS public key that will be used to digitally sign the block for the next (i.e., second) message, which may not yet have been generated.

A receiving device just has to authenticate the origin block to trust that the subsequently sent messages digitally signed with OTS public keys in the hash chain were indeed sent by the sending device—and just has to authenticate the origin block once. The receiving device authenticates a message using the OTS public key included in the prior block that the block for the message links to. The sending device only has to generate one OTS public key in advance. When a new message N is to be sent, only at that time does the sending device have to generate another OTS public key. The newly generated OTS public key is for the next message N+1 and is included in the block N added for message N to the hash chain. The block N is linked to the previously added, prior block N−1 in the hash chain which is for the prior message N−1, and which includes the OTS public key for message N.

The techniques therefore permit even lightweight devices such as IoT devices to provide for authentication of their digitally signed messages in a way that is resistant to quantum computing attacks. Because only a single OTS public key may have to be created in advance, the techniques are computationally inexpensive and can be quickly performed by devices having lesser computing power (i.e., slower processors). The techniques further do not require large amounts of storage space, since a sending device only has to store a single OTS public key at any given time—the key that the device most recently generated and that will be used to authenticate the next message that is sent.

Figure 1A:
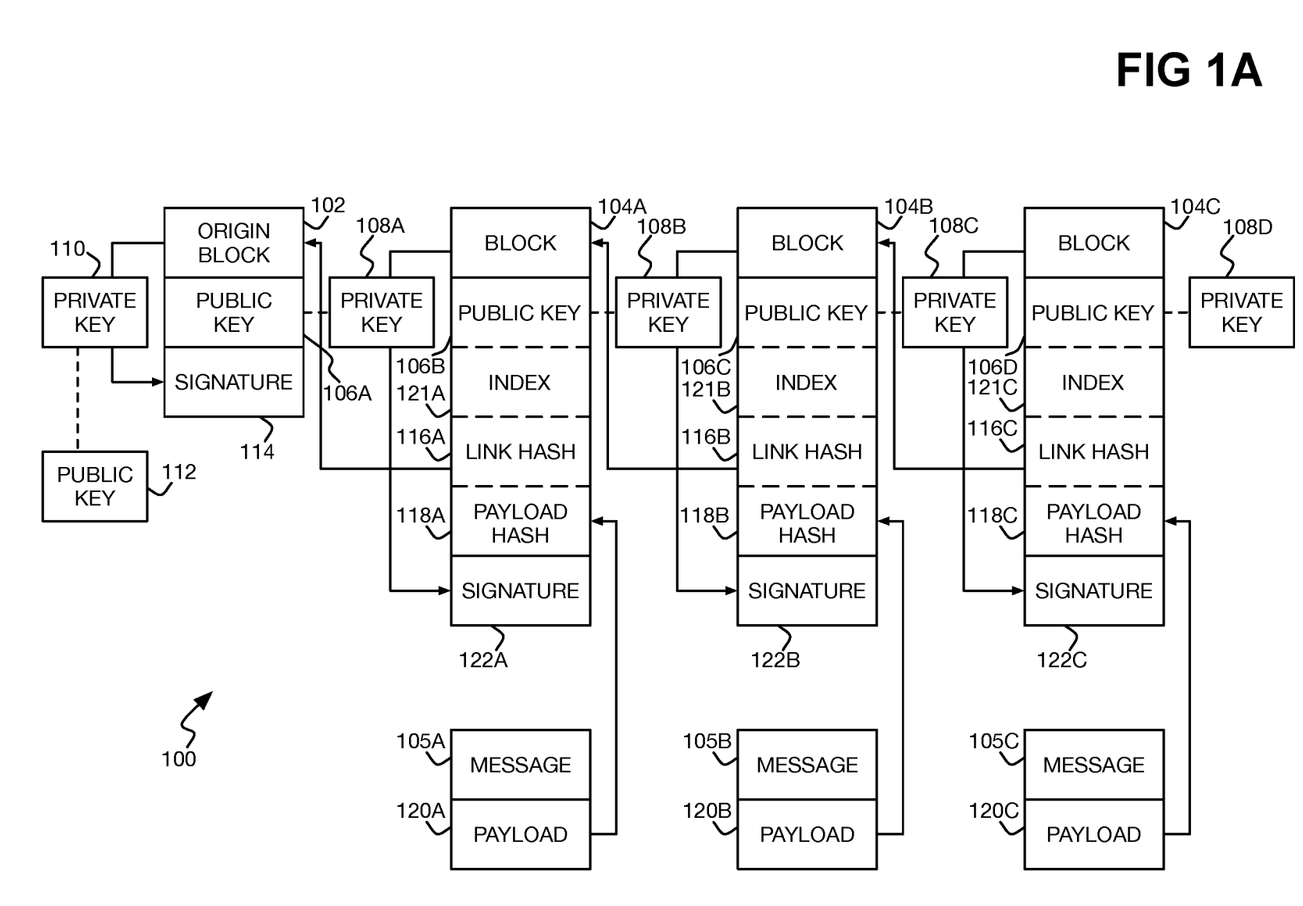
FIG. 1A is a diagram of an example hash chain of blocks of one-time signature (OTS) public keys for authenticating messages.

FIG. 1A shows an example hash chain 100 used to authenticate messages sent by a sending device to a receiving device. The hash chain 100 may be implemented as a blockchain such that it is managed by a peer-to-peer (P2P) computer network for use as a distributed ledger, where nodes collectively adhere to a consensus algorithm protocol to add and validate blocks. The hash chain 100 includes an origin block 102, which is the root block of the hash chain 100 and thus the first block in the hash chain 100. Blocks 104A, 104B, and 104C of the hash chain 100 are also depicted, and are collectively referred to as the blocks 104.

The block 104A is linked to and added after the origin block 102; the block 104B is linked to and added after the block 104A; and the block 104C is linked to and added after the block 104B. The hash chain 100 can ultimately include an indeterminate number of additional blocks 104. In general, each new block 104 is linked to and added after the most recently added block 104 of the hash chain 100. In the depicted example of FIG. 1A, the next block that is added to the hash chain 100 will be linked to the block 104C, the block added after that will be linked to this block, and so on.

The origin block 102 includes an OTS public key 106A corresponding to the OTS private key 108A that is used to digitally sign the block 104A when the block 104A is added to the hash chain 100 after the origin block 102 has already been added. The origin block 102 itself may be digitally signed with a private key 110 corresponding to a public key 112, resulting in the origin block 102 having a signature 114 by which the origin block 102 can be authenticated using the public key 112. Authentication of the origin block 102 occurs in an out-of-band manner with respect to the hash chain 100. That is, the origin block 102 is not authenticated using information stored within the hash chain 100. For instance, the public key 112 may not be stored in the hash chain 100. Authentication of the origin block 102 verifies that the origin block 102—and thus the public key 106A—is associated with the sending device.

When the origin block 102 is generated, the OTS private key 108A and its corresponding OTS public key 106A are generated so that the OTS public key 106A can be included in the origin block 102 before the origin block 102 is added to the hash chain 100. The block 104A, which as noted is added to the hash chain 100 after the origin block 102, corresponds to an individual message 105A from the sending device to a receiving device. The private key 108A and the public key 106A can be generated before the message 105A is generated. Once the message 105A has been generated, but before it has been sent, the block 104A is generated and added to the hash chain 100.

The block 104A includes an OTS public key 106B corresponding to the OTS private key 108B that is used to digitally sign the (next) block 104B when the block 104B is added to the hash chain 100 after the block 104A has already been added. The block 104A includes a link hash 116A of the origin block 102, which links the block 104A to the (prior) origin block 102 in the hash chain 100. The link hash 116A is a cryptographic hash of the origin block 102.

The block 104A includes a payload hash 118A of the payload 120A of the message 105A to which the block 104A corresponds. The payload 120A is the data of the message 105A that the sending device is to send to the receiving device in the message 105A. The block 104A may include a message index 121A that identifies the message 105A, and which may also be included in the message 105A itself (such as in the payload 120A). The message index 121A may indicate the order of the message 105A relative to other messages that the sending device sends to the receiving device. For example, each time a message is sent, its message index may be incremented for the next message.

The block 104A is digitally signed with the OTS private key 108A corresponding to the OTS public key 106A included in the (prior) origin block 102, such that the block 104A has a signature 122A. The message 105A is thus authenticated by authenticating its corresponding block 104A with the public key 106A. Such authentication verifies that the block 104A was signed with the private key 108A corresponding to the public key 106A, and is performed in an in-band manner with respect to the hash chain 100 in that the block 104A is authenticated using information stored within the hash chain 100. When the origin block 102 was previously authenticated (in an out-of-band manner with respect to the hash chain 100), authentication of the block 104A verifies that the corresponding message 105A was sent by the sending device.

When the block 104A is generated, the OTS private key 108B and its corresponding OTS public key 106B are generated so that the OTS public key 106B can be included in the block 104A before the block 104A is added to the hash chain 100. The block 104B, which as noted is added to the hash chain 100 after the block 104A, corresponds to an individual message 105B from the sending device to a receiving device sent after the message 105A. The private key 108B and the public key 106B can be generated before the message 105B is generated. Once the message 105B has been generated, but before it has been sent, the block 104B is generated and added to the hash chain 100.

The block 104B includes an OTS public key 106C corresponding to the OTS private key 108C that is used to digitally sign the (next) block 104C when the block 104C is added to the hash chain 100 after the block 104B has already been added. The block 104B includes a link hash 116B of the block 104A, which links the block 104B to the (prior) block 104A in the hash chain 100. The block 104B includes a payload hash 118B of the payload 120B of the message 105B to which the block 104B corresponds. The block 104B may include a message index 121B that identifies the message 105B, and which may also be included in the message 105B itself.

The block 104B is digitally signed with the OTS private key 108B corresponding to the OTS public key 106B included in the (prior) block 104A, such that the block 104B has a signature 122B. The message 105B is thus authenticated by authenticating its corresponding block 104B with the public key 106B. Such authentication verifies that the block 104B was signed with the private key 108B corresponding to the public key 106B, and is performed in an in-band manner with respect to the hash chain 100. When both the origin block 102 and the block 104A were previously authenticated, authentication of the block 104B verifies that the corresponding message 105B was sent by the sending device.

When the block 104B is generated, the OTS private key 108C and its corresponding OTS public key 106C are generated so that the OTS public key 106C can be included in the block 104B before the block 104B is added to the hash chain 100. The block 104C, which as noted is added to the hash chain 100 after the block 104B, corresponds to an individual message 105C from the sending device to a receiving device sent after the message 105B. The private key 108C and the public key 106C can be generated before the message 105C is generated. Once the message 105C has been generated, but before it has been sent, the block 104C is generated and added to the hash chain 100.

The block 104C includes an OTS public key 106D corresponding to the OTS private key 108D that is used to digitally sign the next block (not depicted in FIG. 1A) when that block is added to the hash chain 100 after the block 104C has already been added. The block 104C includes a link hash 116C of the block 104B, which links the block 104C to the (prior) block 104B in the hash chain 100. The block 104C includes a payload hash 118C of the payload 120C of the message 105C to which the block 104C corresponds. The block 104C may include a message index 121C that identifies the message 105C, and which may also be included in the message 105C itself.

The block 104C is digitally signed with the OTS private key 108C corresponding to the OTS public key 106C included in the (prior) block 104B, such that the block 104C has a signature 122C. The message 105C is thus authenticated by authenticating its corresponding block 104C with the public key 106C. Such authentication verifies that the block 104C was signed with the private key 108C corresponding to the public key 106C, and is performed in an in-band manner with respect to the hash chain 100. When all prior blocks—i.e., the origin block 102 and the blocks 104A and 104B—were previously authenticated, authentication of the block 104C verifies that the corresponding message 105C was sent by the sending device.

When the block 104C is generated, the OTS private key 108D and its corresponding OTS public key 106D are generated so that the OTS public key 106D can be included in the block 104C before the block 104C is added to the hash chain 100. The next block added to the hash chain 100 after the block 104C corresponds to the next individual message to be sent from the sending device to a receiving device after the message 105C. The private key 108D and the public key 106D can be generated before this next message is generated. Once this message has been generated, but before it has been sent, a corresponding block is generated and added to the hash chain 100.

Figure 1B:
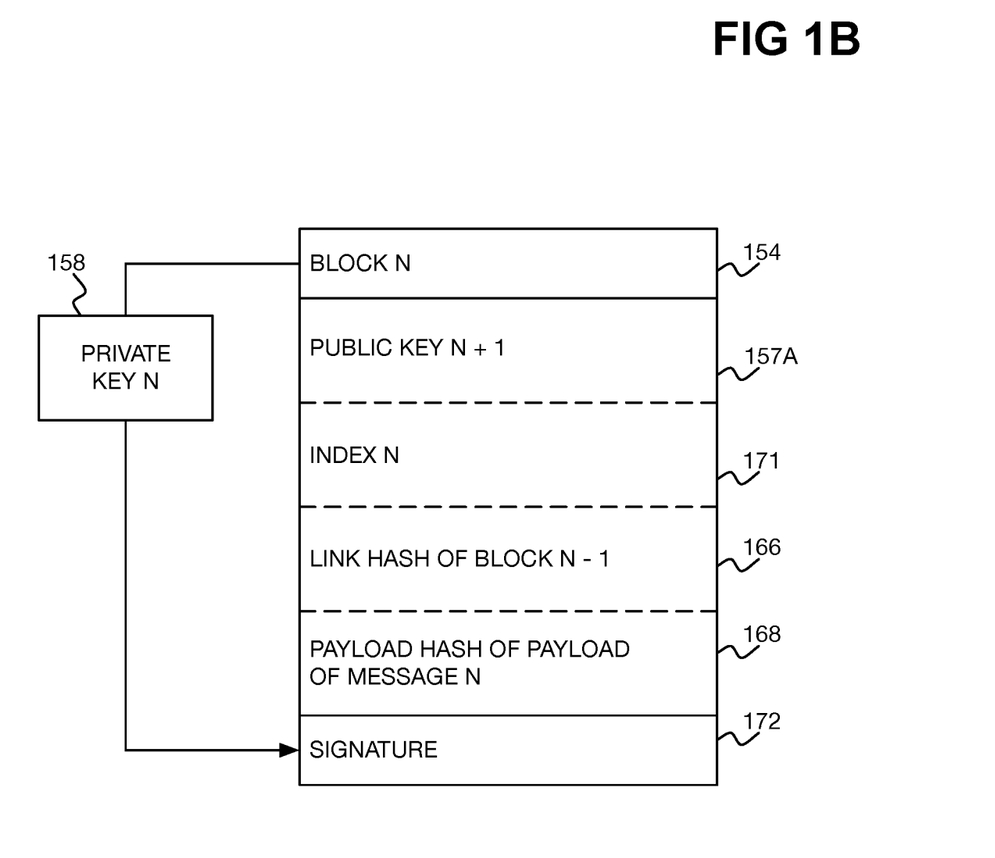
FIG. 1B is a diagram of an example non-origin block of the hash chain of FIG. 1A.

FIG. 1B more generally shows an example block 154 of the hash chain 100 other than the origin block 102. Each of the blocks 104A, 104B, and 104C is an instance of the block 154. The block 154 is for message N, and thus can be referred to as block N. The block 154 includes an OTS public key 157A used to authenticate the next block N+1, and therefore can be referred to as the public key N+1. The block 154 includes a link hash 166 of the prior block N−1, and a payload hash 168 of the payload of message N. The block 154 can include a message index 171 that identifies the message N, which may be referred to as the index N and which may also be included in the message N.

The block 154 is digitally signed with an OTS private key 158, which can be referred to as the private key N that corresponds to the public key N included in the prior block N−1, such that the block 154 has a signature 172. The block N is authenticated with the public key N included in the prior block N−1, which verifies that the block N was signed with the corresponding private key N. This authentication is performed in an in-band manner with respect to the hash chain 100. When the origin block 102 and every prior non-origin block M (0<M<N) in the hash chain 100 were previously authenticated, authentication of block N verifies that the message N was sent by the sending device.

Figure 2:
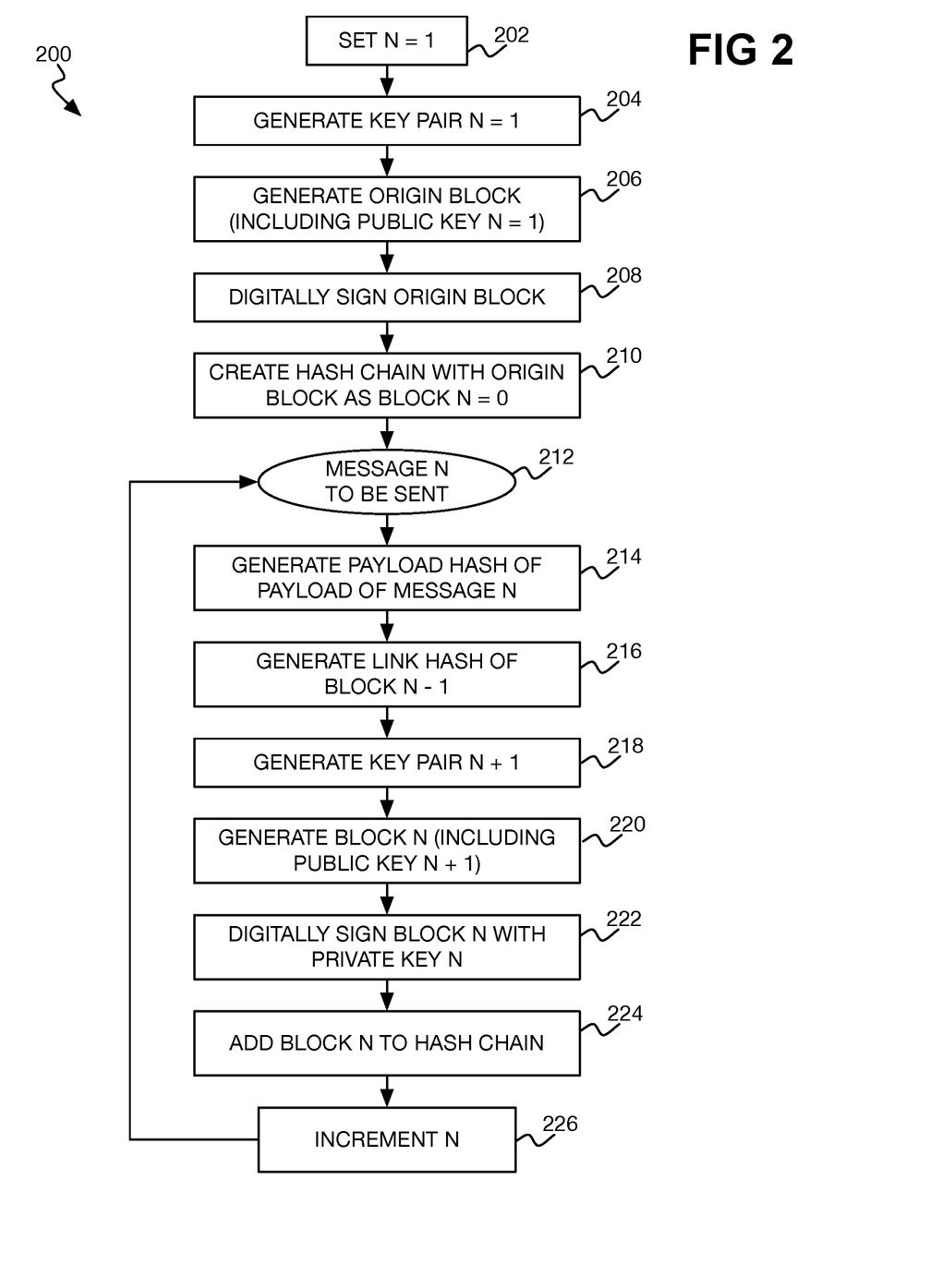
FIG. 2 is a flowchart of an example method for sending messages that can be authenticated using the hash chain of FIG. 1A.

FIG. 2 shows an example method 200 for sending messages that can be authenticated using the hash chain 100. The method 200 is performed by the sending device. The sending device can set N=1 (202), where N may be the message index 171. The sending device generates the cryptographic key pair N=1 for message N=1 that may not yet have been generated (204). Specifically, the sending device generates an OTS private key N=1 and its corresponding OTS public key N=1, such as in accordance with the LM-OTS scheme.

The sending device generates the origin block 102 for the hash chain 100 (206), such that the origin block 102 includes the OTS public key N=1. The sending device digitally signs the origin block 102 with a private key 110 having a corresponding public key 112 that is not stored in the hash chain 100 (208). The sending device creates the hash chain 100 with the origin block 102 as block N=0 (210). The origin block 102 is thus added to the hash chain 100.

When message N is to be sent (212)—i.e., once message N has been generated and is ready to be sent to the receiving device—the sending device generates the payload hash 168 of the payload of message N (214), and generates the link hash 168 of the prior block N−1 (216). The sending device generates the cryptographic key pair N+1 for the next message N+1 that may not yet have been generated (218). The sending device thus generates the OTS private key N+1 and its corresponding OTS public key N+1.

The sending device then generates block N for message N (220), such that block N includes the payload hash 168 of the payload of message N, the link hash 166 of the prior block N−1, and the OTS public key N+1 for the next message N+1. Block N may also include the message index N. The sending device digitally signs block N with OTS private key N (222), such that block N includes the signature 172, and adds digitally signed block N to the hash chain 100 (224). N is incremented by one (226), and the method 200 is repeated at 212 when the next message is to be sent.

Figure 3:
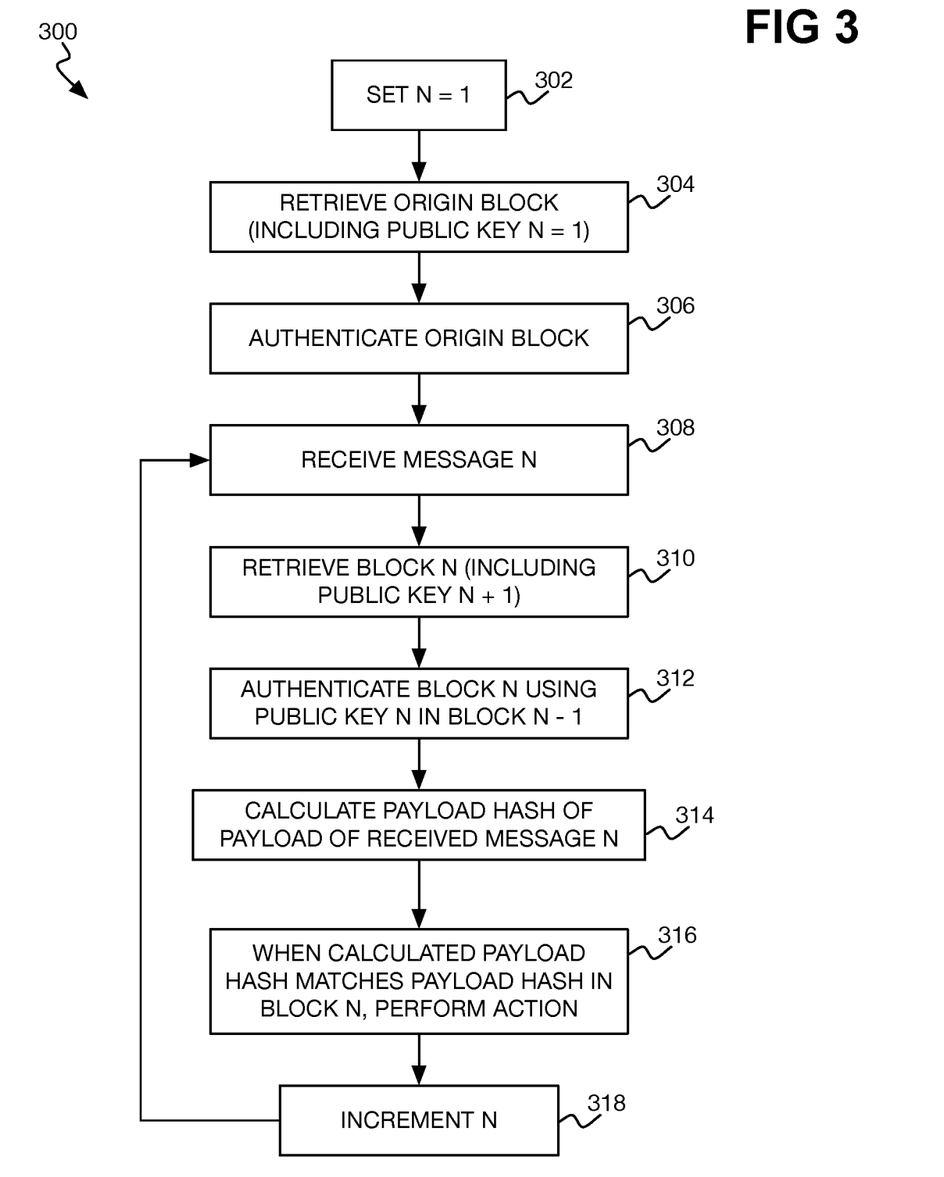
FIG. 3 is a flowchart of an example method for receiving and authenticating messages using the hash chain of FIG. 1A.

FIG. 3 shows an example method 300 for receiving and authenticating messages using the hash chain 100. The method 300 is performed by the receiving device. The receiving device can set N=1 (302), where N may be the message index as separately maintained at the receiving device. The receiving device retrieves the origin block 102 from the hash chain 100 (304), and authenticates the origin block 102 in an out-of-band manner with respect to the hash chain 100 (306). Authentication of the origin block 102 verifies that the origin block 102—and thus public key N=1 included in the origin block 102—is associated with the sending device.

For instance, the receiving device may receive the public key 112 used to authenticate the origin block 102 directly from the sending device, or from a trusted third party that vouches for the public key 112 as being associated with the sending device. In this manner, the public key 112 is trusted and is known to be associated with the sending device, such that authentication of the origin block 102 using the public key 112 verifies that the origin block 102 is itself associated with the sending device.

The receiving device receives message N (308), and in response retrieves from the block chain 100 block N that corresponds to message N (which includes public key N+1 for the next message N+1) (310). The receiving device can retrieve block N in one implementation by retrieving from the block chain 100 the block that has a message index 171 equal to N. The receiving device authenticates block N using public key N in block N−1 that was previously retrieved and authenticated (312). When N=1, block N−1 is the origin block 102; when N>1, block N−1 is the immediately prior non-origin block. The receiving device authenticates block N in that it verifies that the signature 172 of block N has been signed with the private key N corresponding to the public key N.

Authentication may also include verifying that the link hash 166 included in block N refers to prior block N−1 that was previously retrieved and/or that the block that is referred to by the link hash 166 includes the public key N that was previously retrieved when the previously received message N−1 was authenticated. Authentication may further include verifying N as maintained at the receiving device matches the message index of the message that has been received. Authentication of block N may be considered successful only if prior authentication of the origin block 102 (as well as every prior non-origin block when N>1) was successful. That is, block N is authenticated upon having successfully authenticated the origin block 102 (and every prior non-origin block when N>1).

The receiving device further calculates the payload hash of the payload of received message N (314). (The payload hash may be calculated before retrieving block N, such that block N is retrieved by retrieving from the hash chain 100 the block that has a matching payload hash 168, in a different implementation as compared to that noted above.) When the calculated payload hash matches the payload hash included in block N—and upon block N itself having been successfully authenticated—the receiving device authenticates that message N has been sent by the sending device. Therefore, the receiving device can perform an action based on received message N (i.e., based on the payload of received message N) (316).

In other words, because the receiving device has authenticated that message N has been sent by the sending device, the receiving device can act on the message. For example, if the payload of message N includes an action that the receiving device is to perform, the receiving device performs the action. If the payload of message N includes information regarding the sending device or other information, the receiving device can consider this information authentic and store and/or otherwise act on the information. N is incremented by one (318), and the method 300 is repeated at 308 when the next message is received.

In the examples of FIGS. 1A, 1B, 2, and 3 that have been described, the origin block 102 does not correspond to a message 105. However, in another implementation, the origin block 102 can correspond to a message 105. That is, the origin block 102 is the same as any block 104 except that it does not link to a prior block (since it is the first block in the hash chain 100), and is authenticated in an out-of-band manner instead of an in-band manner.

Furthermore, the example method 300 of FIG. 3 has been described on the assumption that every message sent by the sending device is received by the receiving device, where the receiving device authenticates the messages in the order in which the sending device sent the messages. So long as the receiving device receives every message sent by the sending device, the hash chain 100 can be used for an indeterminate number of messages. This means that the receiving device only has to perform authentication in an out-of-band manner once, as to the origin block 102.

However, if a message sent by the sending device is not received by the receiving device, then the hash chain 100 can no longer be used for subsequently sent messages that are received by the receiving device. Rather, a new hash chain 100, with a new origin block 102, has to be created, and the receiving device has to perform out-of-band authentication again. In general, when the receiving device receives a message that is not consecutive to the immediately prior message sent by the sending device, a new hash chain 100 has to be created and a new origin block 102 added to that hash chain 100, followed by out-of-band authentication of the new origin block 102.

Furthermore, when the receiving device receives a message that is not consecutive to the immediately prior message sent by the sending device, authentication of that message will fail at the receiving device. The receiving device may thus signal to the sending device a new hash chain 100 with a new origin block 102 has to be created.

For example, the receiving device may receive and successfully authenticate message 105A. However, the next message that the receiving device receives may be the message 105C. That is, the receiving device may have failed to receive the message 105B that the sending device sent after the message 105A and before the message 105C. In this case, authentication of the message 105C will fail at the receiving device. The hash chain 100 can no longer be used for authentication of messages from the sending device, and a new hash chain 100 with a new origin block 102 is created, followed by out-of-band authentication of the new origin block 102.

Figure 4:
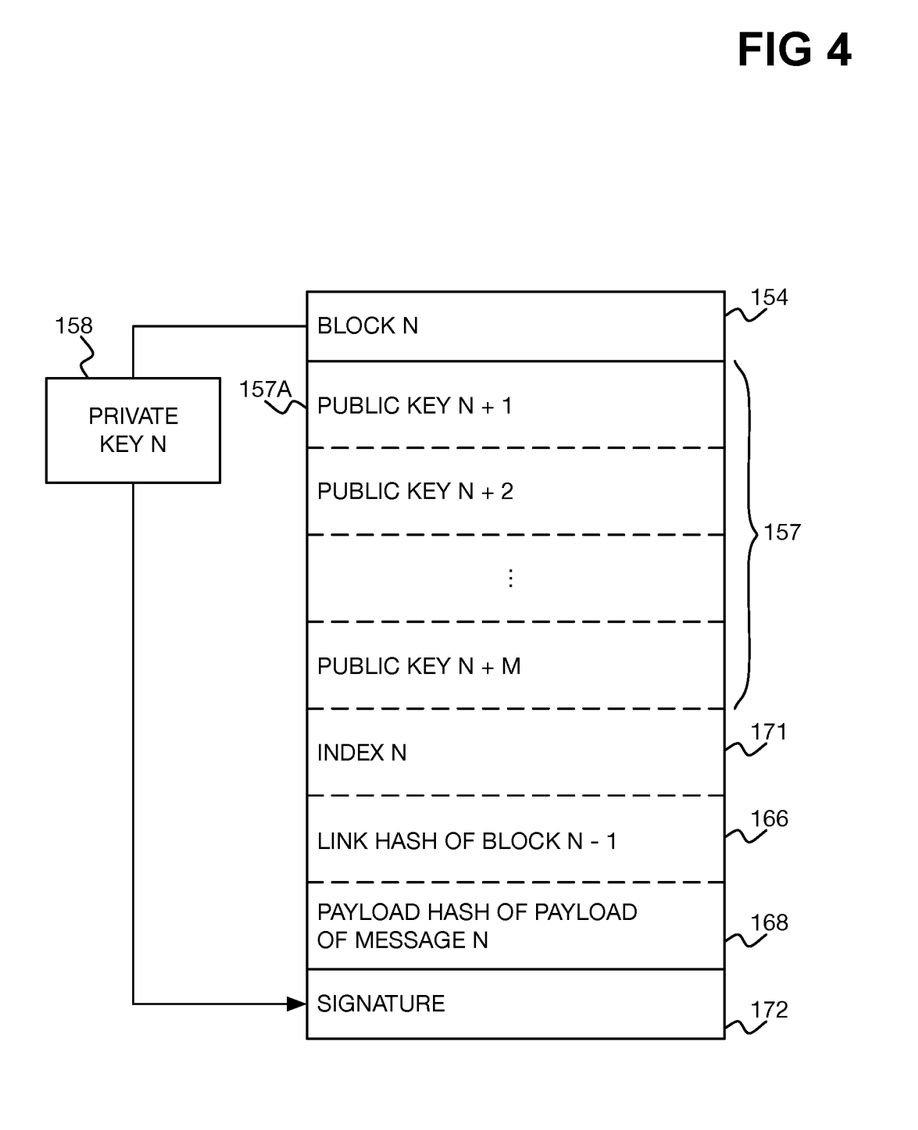
FIG. 4 is a diagram of an example non-origin block of the hash chain of FIG. 1A in an implementation in which OTS public keys for authenticating multiple messages are included in the block.

FIG. 4, however, shows the non-origin block 154 in an example implementation that permits the hash chain 100 to be used even when the receiving device has failed to receive up to M−1 consecutive messages sent by the sending device. The block 154 is for message N and can be referred to as block N. As has been described in reference to FIG. 1B, the block 154 includes a link hash 166 of the prior block N−1 and a payload hash 168 of the payload of message N, and may further include a message index 171. As has also been described, the block 154 is digitally signed with an OTS private key 158, which can be referred to as the private key N that corresponds to the public key N included in the prior block N−1, such that the block 154 has a signature 172.

The block 154 in the example of FIG. 4 includes M OTS public keys 157 respectively corresponding to the next M messages that will be sent. The OTS public key 157A is the public key N+1 used to authenticate the next block N+1 for the next message N+1. The public key N+2 is for block N+2 and thus for message N+2 that will be sent after message N+1, and so on, where the public key N+M is for block N+M and thus for message N+M that will be sent after message N+M−1. In this implementation, the origin block 102 includes the public keys N=1 through N=M.

If after receiving message N the receiving device fails to receive message N+1, N+2, . . . , N+M−1, the receiving device will still be able to successfully authenticate message N+M in an in-band manner if that message is received. This is because block N includes public key N+M corresponding to the private key N+M that the sending device used to digitally sign block N+M, such that the receiving device can successfully authenticate block N+M. A new hash chain 100 with a new origin block 102 does not have to be created.

This implementation can be appropriately used to add a degree of resilience to the hash chain 100 when it is not expected that the receiving device will fail to receive more than a relatively small number M−1 of consecutively sent messages. However, in scenarios in which it is expected that the receiving device may fail to receive a relatively large number M−1 of consecutively sent messages, having to include such a large number M of OTS public keys 157 in each block 154 may be deemed untenable. For instance, the sending device will have to initially create the first M public keys 157 and their M corresponding private keys before sending the first message N=1, and may have to store at least the M corresponding private keys at all times. The sending device may also store the M public keys 157 at all times, or generate them as needed from the M corresponding private keys.

Figure 5A:
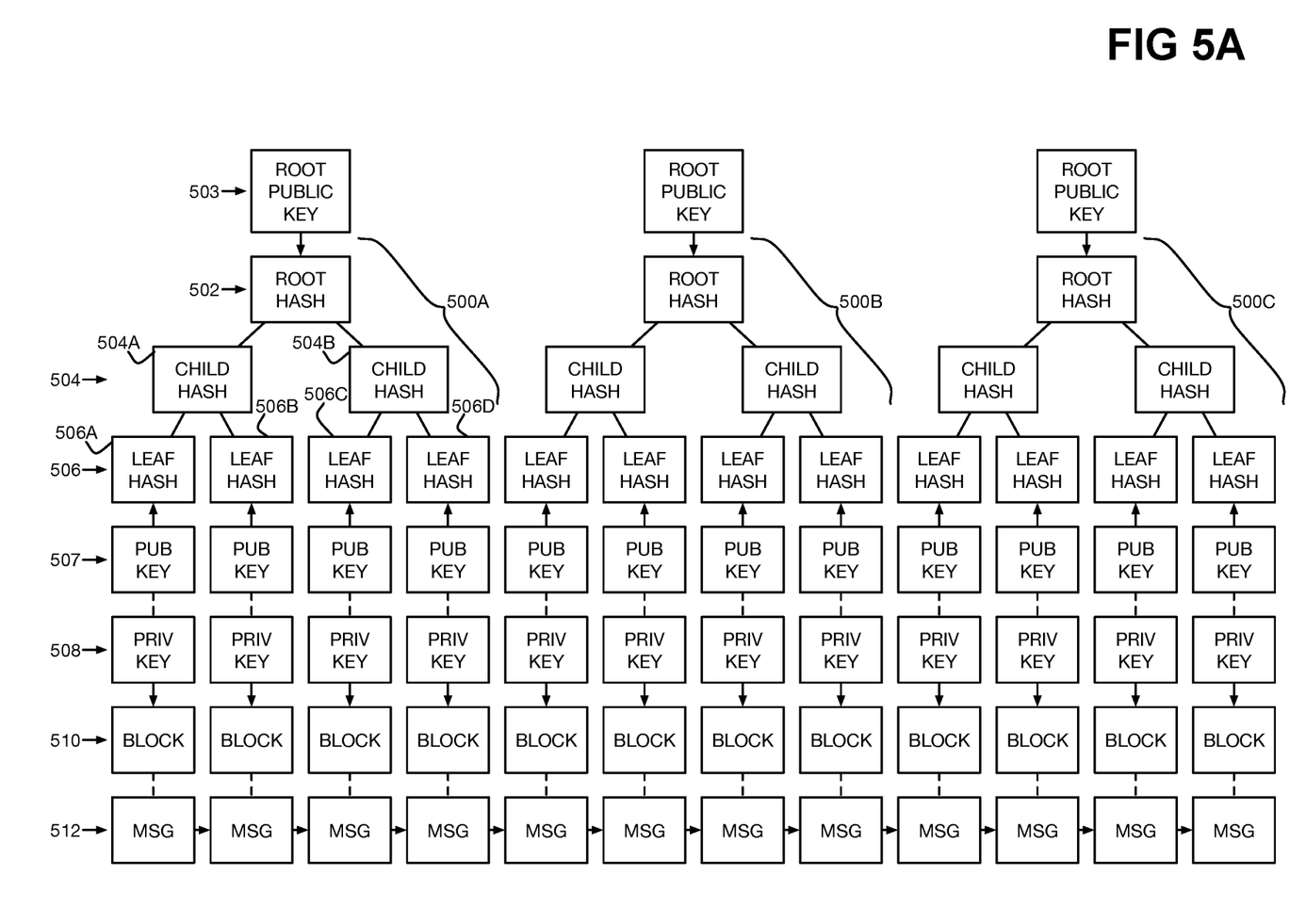
FIG. 5A is a diagram of an example implementation in which Merkle or other binary trees are used for authenticating messages.

FIG. 5A, however, shows an example implementation that permits the hash chain 100 to be used even when the receiving device has failed to receive up to M−1 consecutively sent messages, and which may be appropriate for even a relatively large value of M. The implementation leverages Merkle trees, or another type of cryptographic binary tree, per the LMS, XMSS, or another such scheme. Specifically depicted are the first three Merkle trees 500A, 500B, and 500C, which are collectively referred to as the Merkle trees 500.

Each Merkle tree 500 includes a root hash 502, (intermediate-level) child hashes 504 (e.g., the child hashes 504A and 504B of the tree 500A), and leaf hashes 506 (e.g., the leaf hashes 506A, 506B, 506C, and 506D of the tree 500A). The root hash 502 of a Merkle tree 500 corresponds to a root public key 503, and the leaf hashes 506 respectively correspond to OTS public keys 507. The public keys 507 themselves correspond to OTS private keys 508 used to digitally sign blocks 510 that are added to the hash chain 100 when corresponding messages 512 are sent.

The leaf hashes 506 are also technically child hashes, but because they do not themselves have child hashes are not labeled as such in the figure. Since the tree 500 is a binary tree, every hash other than the leaf hashes 506 has two child hashes. In the example, each Merkle tree 500 has a height h=2, which means that the tree 500 has two levels of hashes below the root hash 502, the level of the child hashes 504 and the level of leaf hashes 506. More generally, each Merkle tree 500 has a height h>1, such that the tree 500 has h−1 intermediate levels of child hashes 504 and one level of leaf hashes 506.

A Merkle tree 500 is created, such as per the LMS or XMSS scheme, as follows. For a specified height h, $2^h$ OTS private keys 508 and $2^h$ corresponding OTS public keys 507 are generated. The leaf hashes 506 correspond to their respective public keys 507 in that they are hashes of the public keys 507 or are the public keys 507. Each child hash 504 is in general a hash of the hashes of its two child hashes. In the example, each child hash 504 is specifically a hash of its two leaf hashes 506. For the tree 500A specifically, the child hash 504A is a hash of the leaf hashes 506A and 506B, and the child hash 504B is a hash of the leaf hashes 506C and 506D.

The root hash 502 is similarly a hash of its two child hashes 504. For the Merkle tree 500A specifically, the root hash 502 is a hash of the child hashes 504A and 504B. The root hash 502 corresponds to the root public key 503. As one example, the root public key 503 may be generated so that the root hash 502 is the hash of the root public key 503 (as well as being the hash of the leaf hashes 506A and 506B). As another example, the root public key 503 may be the root hash 502 (i.e., the root public key 503 can be the hash of the leaf hashes 506A and 506B). As a third example, the root hash 502 may include the root public key 503 as well as other information.

The block 510 for a message 512 is digitally signed with its corresponding OTS private key 508. For the receiving device to authenticate the block 510, and thus to authenticate the message 512, the corresponding public key 507, the authentication path from the leaf hash 506 for the public key 507 to the root hash 502 in the Merkle tree 500 in question, and the root public key 503 of that tree 500 are needed. The public key 507 is calculated by the receiving device from the signature 172 of the block 510. The authentication path is included in the block 510, whereas the root public key 503 is already known (i.e., has already been received or retrieved by) to the receiving device.

The receiving device is provided with the authentication path from the leaf hash 506 for the public key 507 to the root hash 502 (via inclusion of the authentication path in the block 510 itself) because the receiving device is not provided with and therefore does not have the Merkle tree 500 itself. The authentication path includes the information sufficient for the receiving device to calculate the root hash

502 from the public key 507 for the message 512. The receiving device authenticates the block 510 by determining that this calculated root hash 502 corresponds to the root public key 503 that is already known by the receiving device.

For example, the authentication path for the leaf hash 506A can include the leaf hash 506B and the child hash 504B, which are sufficient for the receiving device to calculate the root hash 502 from the public key 507 that the receiving device calculated from the signature 172, and which if the message 512 indeed has been sent by the sending device corresponds to the leaf hash 506A. The receiving device calculates the leaf hash 506A from the calculated public key 507, calculates the child hash 504A from the calculated leaf hash 506A and the provided leaf hash 506B, and calculates the root hash 502 from the calculated child hash 504A and the provided child hash 504B.

The receiving device then determines whether the calculated root hash 502 matches the root public key 503 that it already knows. For example, if the root public key 503 is itself the root hash 502, then the calculated root hash 502 should be the root public key 503 that the receiving device already knows. In this case, if the calculated root hash 502 is not the known root public key 503, then authentication of the message is unsuccessful; that is, the message is not authenticated as having been sent from the sending device.

As another example, the authentication path for the leaf hash 506D can include the leaf hash 506C and the child hash 504A, which are sufficient for the receiving device to calculate the root hash 502 from the public key 507 corresponding to the leaf hash 506D. The receiving device first calculates the public key 507 from the signature 172. The receiving device then calculates the leaf hash 506D from the provided public key 507, calculates the child hash 504B from the calculated leaf hash 506D and the provided leaf hash 506C, and calculates the root hash 502 from the calculated child hash 504B and the provided child hash 504A. If the calculated root hash 502 matches the known root public key 503, then the message has been successfully authenticated as having been sent from the sending device.

Figure 5B:
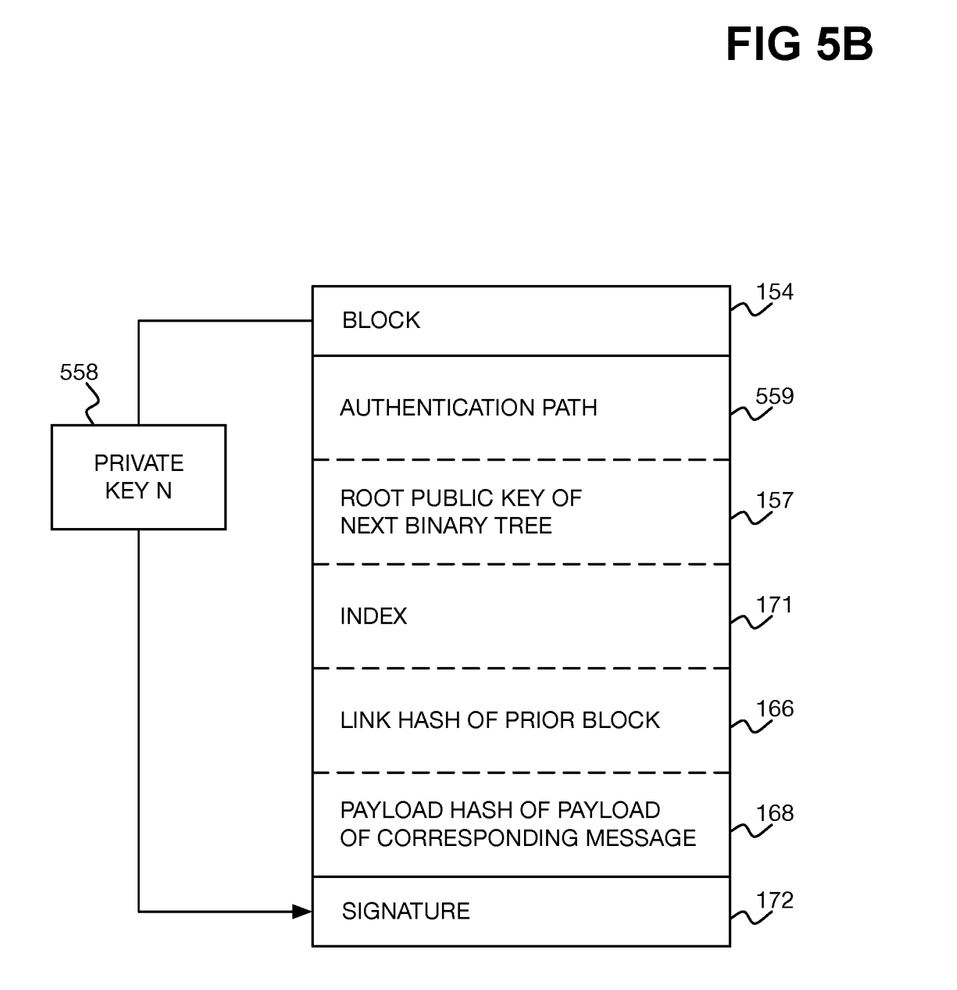
FIG. 5B is a diagram of an example non-origin block of the hash chain of FIG. 1A in the implementation of FIG. 5A.

FIG. 5B shows the non-origin block 154 in this example implementation. Each block 510 is an instance of the non-origin block 154. The block 154 is for message N and therefore can be referred to as block N. As has been described in reference to FIG. 1B, the block 154 includes a link hash 166 of the prior block N−1 and a payload hash 168 of the payload of message N, and may further include a message index 171. The block 154 is digitally signed with an OTS private key 558, which can be referred to as the private key N, such that the block 154 has a signature 172. The OTS public key corresponding to the OTS private key 558 can be referred to as the public key N.

The block 154 includes the authentication path 559 from the leaf hash 506 corresponding to the public key N to the root hash 502 corresponding to the root public key 503 in the Merkle tree 500. The block 154 includes the root public key 157 of the next Merkle tree 500, in lieu of the public key 157A for the next block N+1 as in FIG. 1B, and in lieu of the public keys 157 for the next M blocks as in FIG. 4. The origin block 102 in this implementation includes the root public key 157 of the first Merkle tree 500A in lieu of the public key 507 for the first block N=1.

The blocks 510 for the first four messages 512 therefore each include the root public key 503 for the second Merkle tree 500B. The blocks 510 for the next four messages 512 after that each include the root public key 503 for the third Merkle tree 500C. The root public key 503 for the first Merkle tree 500A is included in the origin block 102.

After having authenticated the origin block 102 in an out-of-band manner, the receiving device can authenticate any received message 512 corresponding to the first Merkle tree 500A in an in-band manner. The receiving device is able to authenticate any such message 512 regardless of whether it has received any other such message 512. That is, authentication of a received message 512 corresponding to the tree 500A does not depend on having authenticated or even having received any other message 512 which corresponds to the tree 500A.

Similarly, after having authenticated the origin block 102 in an out-of-band manner and at least one received message 512 corresponding to the first Merkle tree 500A in an in-band manner, the receiving device can authenticate any received message 512 corresponding to the second Merkle tree 500B in the in-band manner. The receiving device is able to authenticate any such message 512 regardless of whether it has received any other such message 512. Authentication of a received message 512 corresponding to the tree 500B does not depend on having authenticated or even having received any other message 512 corresponding to the tree 500B.

In general, for authentication of a received message 512 corresponding to a given Merkle tree 500, the origin block 102 and only a single message 512 corresponding to every prior Merkle tree 500 (if any) has to have been previously authenticated. If no message 512 for a given Merkle tree 500 is received, however, a new hash chain 100 has to be created with an origin block 102 including the root public key 503 of the next Merkle tree 500 before messages 512 corresponding to the next Merkle tree 500 can be authenticated.

This implementation also adds a degree of resilience to the hash chain 100. Prior to sending the first message 512, the sending device just has to create the first two Merkle trees 500A and 500B so that the root public key 503 for the first tree 500A can be included in the origin block 102 and so that the root public key 503 for the second tree 500B can be included in the blocks 510 for the first $2^h$ messages 512. The sending device therefore just has to generate $2 \times 2^h$ OTS private keys 508 and their corresponding public OTS public keys 507 before sending the first message 512.

Once the first $2^h$ messages 512 have been sent, the sending device then has to create the third Merkle tree 500C so that the root public key 503 for the third tree 500C can be included in the blocks 510 for the next $2^h$ messages 512. In general, after every $2^h$ messages 512 are sent, the sending device has to create another Merkle tree 500. Therefore, after every $2^h$ messages 512 are sent, the sending device has to generate $2^h$ OTS private keys 508 and their corresponding OTS public keys 507 before sending any of the next $2^h$ messages 512.

Figure 6:
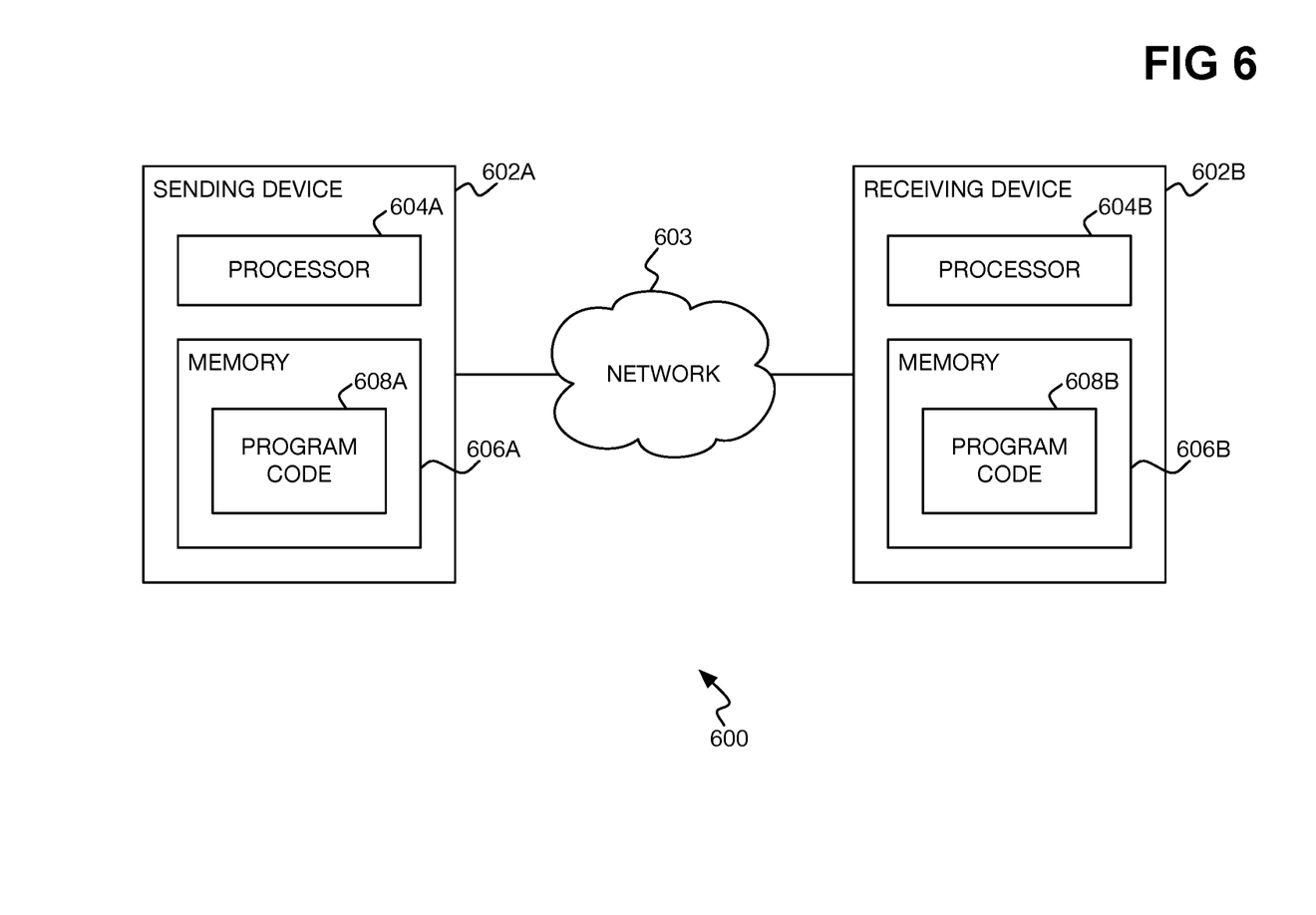
FIG. 6 is a diagram of an example system in which messages from a sending device to a receiving device can be authenticated using the hash chain of FIG. 1A.

FIG. 6 shows an example system 600 including a sending device 602A and a receiving device 602B communicatively connected to one another via a network 603. Each of the devices 602A and 602B can be a computing device or another type of electronic device. Examples of computing devices include desktop, laptop, notebook, and server computers, as well as other computing devices, including smartphones, tablet computing devices, and so on. Other types of electronic devices include networking devices such as routers, firewalls, access points, and so on, as well as printing and/or image devices such as printers, scanners, and all-in-one (AIO) devices that have at least printing functionality and scanning functionality. At least one of the devices 602A and 602B may be a lightweight device such as an IoT device. The network 603 may be or include the Internet and/or other types of networks.

The sending device 602A and the receiving device 602B respectively include processors 604A and 604B and memory 606A and 606B, the latter which are each more generally a non-transitory computer-readable data storage medium. The memory 606A stores program code 608A executable by the processor 604A of the sending device 602A to perform processing to send messages to the receiving device 602B that can be authenticated using the hash chain 100 as has been described. The memory 606B stores program code 608B executable by the processor 604B of the receiving device 602B to perform processing to receive and authenticate the messages using the hash chain 100 as has been described.

Techniques have been described herein for using a hash chain of blocks of OTS public keys to authenticate messages in a way that is resistant to quantum computing attacks but that can still be performed by even lightweight devices such as IoT devices. The techniques are computationally inexpensive in that just a single OTS public key may have to be created in advance. The techniques further do not require large amounts of storage space, and just a single OTS public key may have to be stored at any given time.

We claim:

1. A method performed by a sending device and comprising:
    generating a block to be added to a hash chain, the block for a message to be sent to a receiving device, the block including:
        a link hash of a prior block previously added to the hash chain, the prior block including a public key corresponding to a private key to be used to digitally sign the block;
        a payload hash of a payload of the message; and
        a next public key corresponding to a next private key to be used to digitally sign a next block to be added to the hash chain after the block, the next block for a next message to be sent to the receiving device after the message;
    digitally signing the block with the private key;
    adding the block to the hash chain, the link hash included in the block linking the block to the prior block in the hash chain; and
    sending the message to the receiving device.
2. The method of claim 1, wherein the public key is a one-time signature (OTS) public key such that the private key to which the public key corresponds is used only to digitally sign the block for the message and not to digitally sign any other block for any other message.
3. The method of claim 1, wherein the link hash is generated using a cryptographic hash function.
4. The method of claim 1, wherein the block further includes a message index identifying the message.
5. The method of claim 1, wherein digitally signing the block comprises generating a digital signature of at least the link hash, the payload hash, and the next public key,
    and wherein the method further comprises adding the digital signature to the block before adding the block to the hash chain.
6. The method of claim 1, wherein the block is authenticated by the receiving device in an in-band manner with respect to the hash chain, using the public key included in the prior block.

7. The method of claim 6, wherein the prior block is an origin block and is authenticated by the receiving device in an out-of-band manner with respect to the hash chain,
    and wherein authentication of the block is successful only if prior authentication of the origin block was successful.
8. The method of claim 6, wherein the prior block is not an origin block and is authenticated by the receiving device in the in-band manner with respect to the hash chain,
    wherein the origin block is authenticated by the receiving device in an out-of-band manner with respect to the hash chain,
    wherein authentication of the prior block is successful only if prior authentication of at least the origin block was successful,
    and wherein authentication of the block is successful only if prior authentication of at least the prior block and the origin block was successful.
9. The method of claim 1, wherein the next public key, the next private key, the next block, and the next message are respectively a first public key, a first private key, a first block, and a first message,
    wherein the block further includes a second public key corresponding to a second private key to be used to digitally sign a second block to be added to the hash chain after the first block, the second block for a second message to be sent to the receiving device after the first message,
    and wherein the block further includes a third public key corresponding to a third private key to be used to digitally sign a third block to be added to the hash chain after the second block, the third block for a third message to be sent to the receiving device after the second message.
10. The method of claim 9, wherein inclusion of the second public key permits the receiving device to authenticate the second message in an in-band manner with respect to the hash chain even if the receiving device does not receive the first message,
    and wherein inclusion of the third public key in the block permits the receiving device to authenticate the third message in the in-band manner with respect to the hash chain even if the receiving device does not receive the first message and the second message.
11. The method of claim 1, wherein the private key with which the block is digitally signed corresponds to a leaf public key that corresponds to a leaf hash of a binary tree of hashes including a root hash that corresponds to a root public key and a plurality of other leaf hashes that respectively correspond to other leaf public keys,
    wherein the public key included in the prior block is the root public key,
    wherein the block further includes an authentication path from the leaf hash to the root hash in the binary tree,
    wherein the next public key included in the block is a next root public key corresponding to a root hash of a next binary tree.
12. The method of claim 11, wherein the block is authenticated by the receiving device in an in-band manner with respect to the hash chain, using the root public key included in the prior block, the authentication path included in the block, and the leaf public key, which the receiving device computes,
    and wherein inclusion of the root public key in the prior block permits the receiving device to authenticate any subsequently received message corresponding to another leaf hash in the binary tree regardless of whether any other message corresponding to any other leaf hash in the binary tree has been received.

13. A sending device comprising:
a processor; and
a memory storing program code executable by the processor to:
  generate a first private key to be used to digitally sign a first block to be generated for a first message to be sent to a receiving device, and a first public key corresponding to the first private key;
  generate an origin block to be added to a hash chain, the origin block including the first public key;
  digitally sign the origin block;
  add the digitally signed origin block to the hash chain;
  generate a second private key to be used to digitally sign a second block for a second message to be sent to the receiving device, and a second public key corresponding to the second private key;
  generate a first block to be added to the hash chain, the first block for the first message including a link hash of the origin block, a payload hash of a payload of the first message, and the second public key;
  digitally sign the first block with the first private key;
  add the digitally signed first block to the hash chain, the link hash of the origin block included in the first block linking the first block to the origin block in the hash chain; and
  send the first message to the receiving device.

14. The sending device of claim 13, wherein the program code is executable by the processor to further:
  generate a third private key to be used to digitally sign a third block for a third message to be sent to the receiving device, and a third public key corresponding to the third private key;
  generate a second block to be added to the hash chain, the second block for the second message including a link hash of the first block, a payload hash of a payload of the second message, and the third public key;
  digitally sign the second block with the second private key;
  add the second block to the hash chain, the link hash of the first block included in the second block linking the second block to the first block in the hash chain; and
  send the second message to the receiving device.

15. The sending device of claim 13, wherein the program code is executable by the processor to further:
  generate a third private key to be used to digitally sign a third block for a third message to be sent to the receiving device, and a third public key corresponding to the third private key, wherein the first block further includes the third public key;
  generate a fourth private key to be used to digitally sign a fourth block for a fourth message to be sent to the receiving device, and a fourth public key corresponding to the fourth private key;
  generate a second block to be added to the hash chain, the second block for the second message including a link hash of the first block, a payload hash of a payload of the second message, the third public key, and the fourth public key;
  digitally sign the second block with the second private key;
  add the digitally signed second block to the hash chain, the link hash of the first block included in the second block linking the second block to the first block in the hash chain; and
  send the second message to the receiving device.

16. The sending device of claim 13, wherein the first public key and the second public key are leaf public keys respectively corresponding to leaf hashes of a binary tree including a root hash corresponding to a root public key,
  wherein the first block further includes an authentication path from the leaf hash corresponding to the first public key to the root hash corresponding to the root public key,
  wherein the origin block includes, in lieu of the first public key, the root public key,
  and wherein the first block includes, in lieu of the second public key, a next root public key corresponding to a root hash of a next binary tree.

17. A non-transitory computer-readable data storage medium storing program code executable by a receiving device to perform processing comprising:
  receiving a first message from a sending device;
  retrieving a digitally signed first block of a hash chain, the first block corresponding to the first message and digitally signed with a first private key corresponding to a first public key, the first block including a link hash of an origin block of the hash chain, a payload hash of a payload of the first message, and a second public key for a second message from the sending device;
  retrieving the origin block of the hash chain using the link hash, the origin block including the first public key;
  authenticating the origin block in an out-of-band manner with respect to the hash chain;
  upon successfully authenticating the origin block, authenticating the first block using the first public key included in the origin block;
  calculating the payload hash of the payload of the first message received from the sending device; and
  upon successfully authenticating the first block and when the calculated payload hash matches the payload hash included in the first block, performing a first action based on the first message.

18. The non-transitory computer-readable data storage medium of claim 17, wherein the processing further comprises:
  receiving the second message from the sending device;
  retrieving a digitally signed second block of the hash chain, the second block corresponding to the second message and digitally signed with a second private key corresponding to the second public key, the second block including a link hash of the first block of the hash chain, a payload hash of a payload of the second message, and a third public key for a third message from the sending device;
  authenticating the second block using the second public key included in the first block;
  calculating the payload hash of the payload of the second message received from the sending device; and
  upon successfully authenticating the second block and when the calculated payload hash of the payload of the second message matches the payload hash of the payload of the second message included in the second block, performing a second action based on the second message.

19. The non-transitory computer-readable data storage medium of claim 18, wherein the first block further includes the third public key for the third message,
  and wherein the second block further includes a fourth public key for a fourth message from the sending device.

20. The non-transitory computer-readable data storage medium of claim 18, wherein the first, second, and third public keys are leaf public keys respectively corresponding to leaf hashes of a binary tree including a root hash corresponding to a root public key,
> wherein the first block includes an authentication path from the leaf hash corresponding to the first public key to the root hash corresponding to the root public key,
> 
> wherein the second block includes an authentication path from the leaf hash corresponding to the second public key to the root hash corresponding to the root public key,
> 
> wherein the origin block includes, in lieu of the first public key, the root public key,
> 
> wherein the first block includes, in lieu of the second public key, a next root public key corresponding to a root hash of a next binary tree,
> 
> and wherein the second block includes, in lieu of the third public key, the next root public key.

* * * * *